United States Patent [19]

Huang et al.

[11] Patent Number: 4,636,638

[45] Date of Patent: Jan. 13, 1987

[54] REMOTE OPTICAL CRACK SENSING SYSTEM INCLUDING FIBEROPTICS

[75] Inventors: Shih L. Huang, Southampton; Arthur Scotese, Audubon; Mark Libeskind, Cornwells Heights; Lee W. Gause, Warminster, all of Pa.

[73] Assignee: The United States of America as represented by the Secretary of the Navy, Washington, D.C.

[21] Appl. No.: 660,349

[22] Filed: Oct. 12, 1984

[51] Int. Cl.⁴ .............. G01D 5/34; G01B 11/16; G01L 1/24
[52] U.S. Cl. .................. 250/231 R; 356/32; 73/800; 250/227
[58] Field of Search ............ 250/227, 231 R; 356/32, 356/33, 34; 73/800

[56] References Cited

U.S. PATENT DOCUMENTS 4,163,397 8/1979 Harmer ................. 356/32
4,477,725 10/1984 Asawa ................. 73/800

Primary Examiner—David C. Nelms
Assistant Examiner—William L. Oen
Attorney, Agent, or Firm—Robert F. Beers; Henry Hansen

[57] ABSTRACT

An apparatus is disclosed for remotely detecting cracks of sub-critical length which originate from stress raisers in structural materials, wherein the apparatus typically comprises a source of light, a continuous length of optical fiber to conduct the light, strain responsive devices coupled to the fiber and bonded to the structural member in close proximity to the stress raisers, and a light responsive detector which is optically coupled to the fiber in order to detect breaks in the fiber induced by either tensile or shear forces eminating from cracks around the stress raisers.

2 Claims, 6 Drawing Figures

REMOTE OPTICAL CRACK SENSING SYSTEM INCLUDING FIBEROPTICS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to materials testing, and more particularly to strain responsive devices which detect the presence of intiial crack growth and subsequent propogation of cracks in structural members.

In the art of materials testing, it is highly desirable to detect a crack in the tested material sometime before it reaches a critical length, at which point unstable crack propagation and structural failure may occur. This is particularly true in cases where stress raisers, i.e., notches, holes, or other discontinuities in contour or structure which cause localized stress concentration, are present in the tested material.

Strain responsive devices, such as those which are bonded to the tested material and dependent upon either the severing of an electrically conductive element or the cracking of a pre-machined notch, have been used in the pars with some degree of success to detect such cracks. However, if a crack in the tested material does not initiate or subsequently propagate directly beneath the device used, the electrically conductive element or pre-machined notch may not break, thus negating the efficacy of the device.

SUMMARY OF THE INVENTION

Accordingly, it is a general purpose and object of the present invention to provide a system which is capable of remotely detecting cracks in structural members.

More specifically, it is an object of the present invention to provide a system which is capable of remotely detecting cracks of sub-critical length which originate from stress raisers in structural members.

A further object of the present invention is to provide a crack sensing system which is simple and inexpensive to construct.

Briefly, these and other objects of the present invention are accomplished by a remote optical crack sensing system which includes a continuous length of optical fiber conducting light through sensors bonded to the structural member in close proximity to stress raisers in critical locations. A light responsive device, optically coupled to the fiber, detects breaks in the fiber induced by either tensile or shear forces emanating from cracks around the stress raisers.

Other objects, advantages and novel features of the invention will become apparent from the following detailed description of the invention when considered in conjunction with the accompanying drawings wherein:

DETAILED DESCRIPTION OF THE PREFERRED EMBODIMENT

Figure 1:
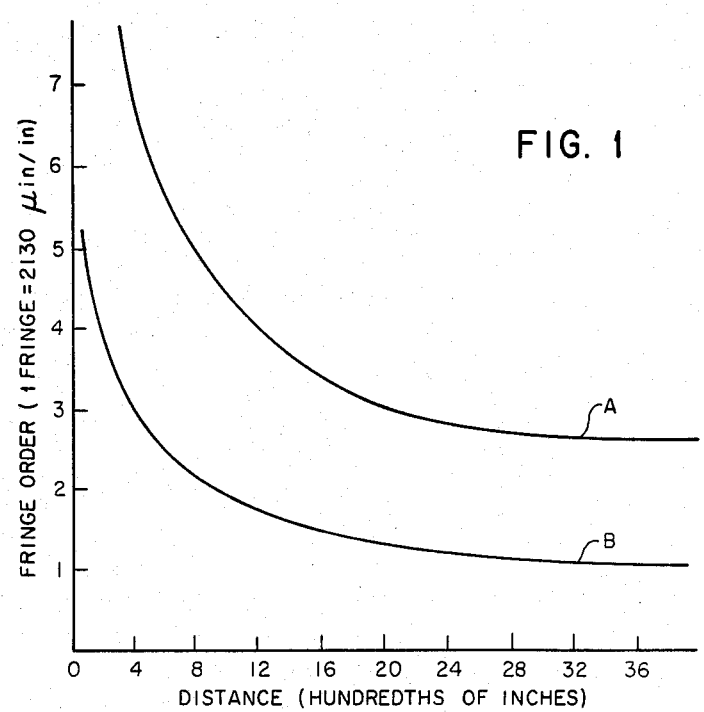
FIG. 1 shows comparative results of a photoelastic study performed in conjunction with the present invention.

Referring now to the drawings, wherein like characters designate like or corresponding parts throughout the several views, there is shown in FIG. 1 comparative results of a photoelastic study performed on two samples simulating structural members made of aluminum alloy (ASTM B209-65, 7075-T6, modulus of elasticity=10.4 million psi). Having a 0.06 inch crack propagating from a 0.25 inch hole, the first sample was subjected to a 40,900 psi nominal stress in a direction perpendicular to the crack. The second sample, having the same 0.25 inch hole without a crack, was tested under the same conditions. Curve A indicates the strain measured in the first sample at distances away from the crack tip, while curve B indicates the strain measured in the second sample at distances away from the hole. For example, the strain at a point 0.16 inch away from the crack tip in the first sample was 6,930 $\mu$in./in., while the second sample's strain measured at a point 0.16 inch away from the hole was 4,270 $\mu$in./in. This shows that a crack propagating from a hole significantly amplifies the strain distribution away from the crack tip.

Figure 2:
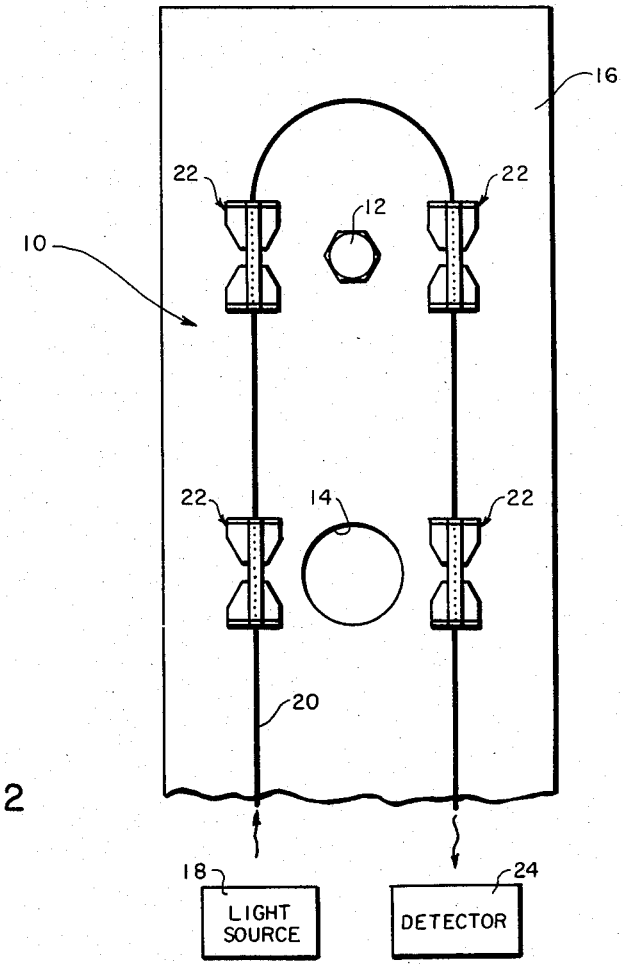
FIG. 2 illustrates a remote optical crack sensing system according to the present invention as applied to a structural member.
Figure 3:
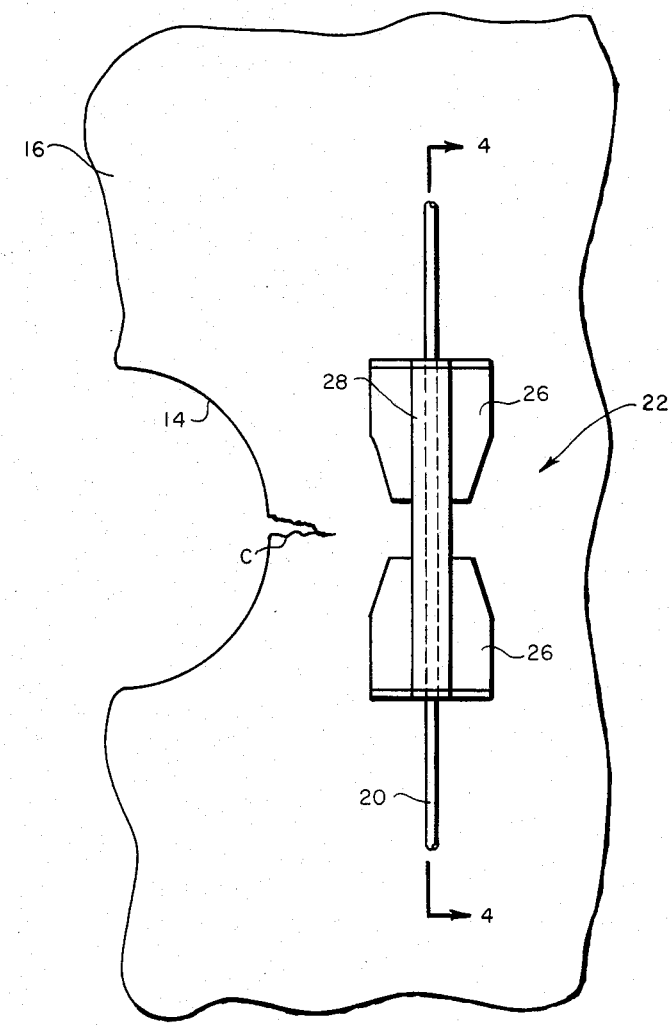
FIG. 3 illustrates one embodiment of a crack sensor in the system of FIG. 2.
Figure 4:
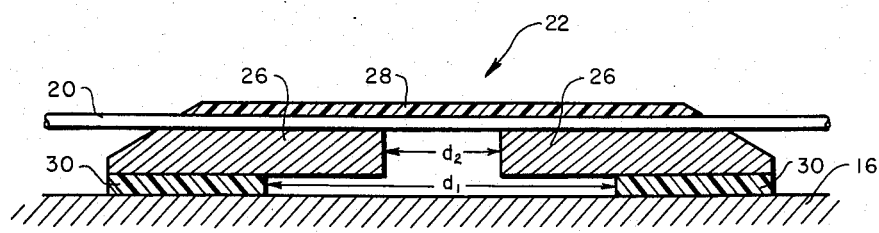
FIG. 4 is a cross-sectional view of the sensor taken along the line 4—4 of FIG. 3.

In light of this phenomenon, FIG. 2 shows a remote optical crack sensing system 10 used to detect cracks, such as crack C, which originate from stress raisers, such as a bolted connection 12 or a hole 14 in a structural member 16. The system 10 generally includes a light source 18 optically coupled to a length of single strand optical fiber 20. A plurality of sensors 22 are coupled to the fiber 20 in a manner described hereinbelow, and a light responsive detector 24, optically coupled to the fiber 20, detects breaks in the fiber 20 induced by tensile forces emanating from cracks around the stress raisers.

Each sensor 22 includes a pair of thin connectors 26 spaced apart along the length of the fiber 20 and bonded thereto by a thin layer of a graphite/epoxy composite 28 which also bridges across the space between connectors 26 on fiber 20. One suitable such material which may be used for composite 28 is a preimpregnated laminate AS4/3501-6 manufactured by Hercules Corporation Aerospace Division (modulus of elasticity=21 million psi). The connectors 26 are made of any suitable rigid material such as steel, are tapered at both ends in order to reduce stress concentrations and are firmly bonded to the member 16 by any suitable adhesive 30, so that the ratio of distance $d_1$ between the bonded connector/member interface to the distance $d_2$ between the pair of connectors 26 is approximately 3:1, thus providing a strain multiplication factor of three. While this ratio was found to be optimum for remotely detecting cracks of subcritical length in structural members such as aircraft components, greater sensitivity can be achieved by increasing the ratio of $d_1/d_2$ in the individual sensors 22.

Since the composite 28 layer used in this embodiment fails in the range of from 1.0 to 1.4% strain (i.e., 10,000 to 14,000 $\mu$in./in.), the strain level from cracks around stress raisers need only be slightly amplified. The brittle fracture mode of the composite 28 will cause a shift in load and will induce a breakage of the fiber 20, thus terminating the light path at the detector 24 and indicating that a crack has initiated within the member 16. In order to further promote any such breakage in the fiber 20, fiber 20 may be uncoated along its length which is bonded between the connectors 26 and composite 28. Moreover, in order to provide a greater shear distortion effect which will further cause misalignment of the broken fiber 20 ends, the composite 28 may be applied with a ±45° design bias.

Figure 5:
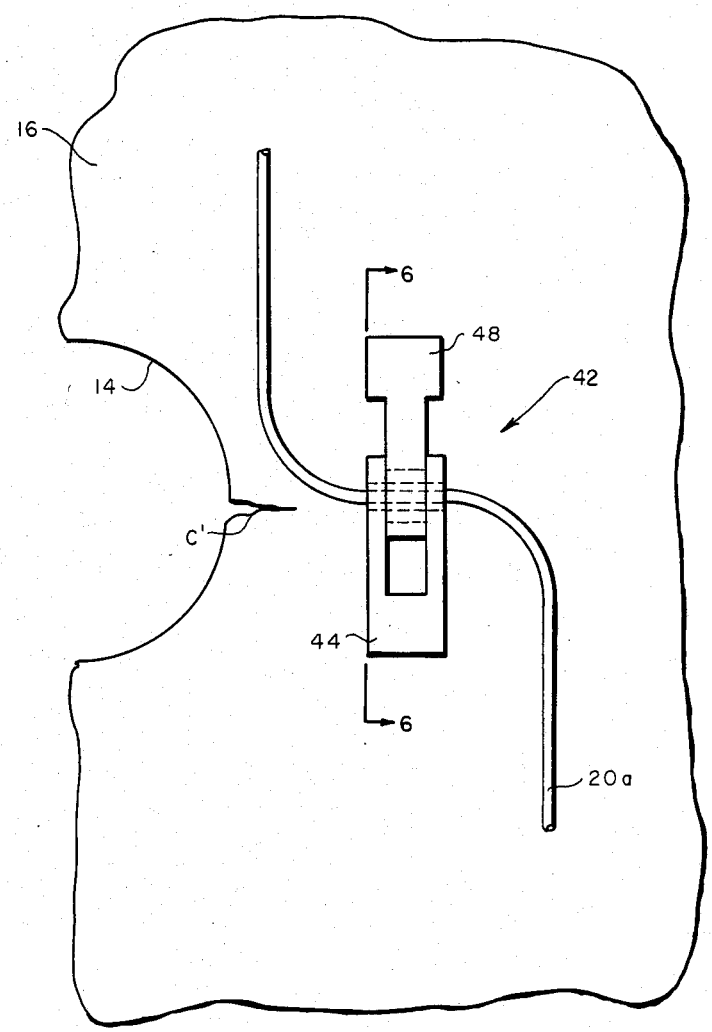
FIG. 5 illustrates another embodiment of a crack sensor in the system of FIG. 2.
Figure 6:
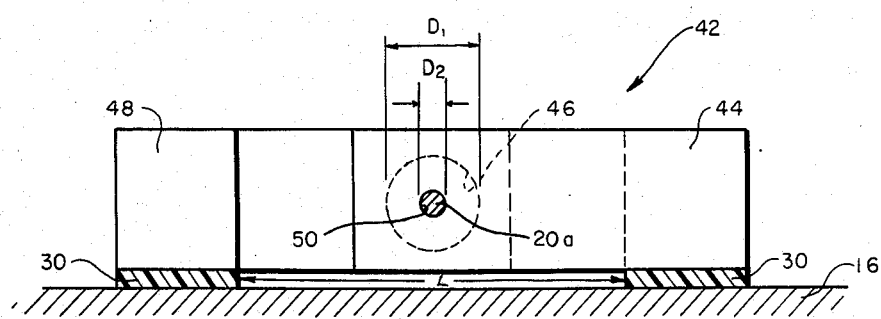
FIG. 6 is a cross-sectional view of the sensor taken along the line 6—6 of FIG. 5.

Referring now to FIGS. 5 and 6, there is shown a sensor 42 which may be substituted for sensor 22 in the system 10 shown in FIG. 2. Each sensor 42, includes a cutter 48 having a hole 46 of diameter $D_1$ extending transversely therethrough and a bifurcated member 44 adapted to be slidingly coupled to the cutter 48 and having a hole 50 of diameter $D_2$ closely aligned with hole 46 and sufficiently large to permit the fiber 20 to slidingly pass through. The bifurcated member 44 and cutter 48 are each bonded to the structural member 16 by any adhesive 30, with a distance L between the bonded surfaces of member 44 and cutter 48. When a crack C' originating from hole 14 in the structural member 16 propogates, the fiber 20 will fail in shear at a predetermined strain, E, as defined by the equation:

$$E = \frac{\left[\frac{D_1}{2} - \frac{D_2}{2}\right]}{L} = \frac{D_1 - D_2}{2L}.$$

In operation, for example as used in an aircraft, a plurality of systems 10 may be installed on individual stress critical structural members such as aileron or elevator surfaces. Each sensor 22 or 42 is bonded to the structural member in close proximity (e.g., 0.10 to 0.25 inch) to stress raisers, such that when cracks emanate from the stress raisers, the fiber 20 will break at the sensors 22 or 42 and an indication thereof will be shown on a cockpit detector 24.

Some of the many advantages of the invention should now be readily apparent. For example, a novel system has been provided which is capable of remotely detecting cracks of subcritical length originating from stress raisers in structural members by monitoring the light which is conducted through a length of single strand optical fiber having a plurality of sensors attached thereto. Tensile or shear forces emanating from such cracks will induce breakage in the fiber, thus breaking the light path and indicating that such a crack exists.

Obviously many modifications and variations of the present invention are possible in light of the above teachings. It is therefore to be understood that within the scope of the appended claims, the invention may be practiced otherwise than as specifically described.

What is claimed is:

1. Apparatus for detecting cracks which originate from a stress raiser in a structural material, comprising in combination:

a length of optical fiber having two ends;

means for injecting light into one of said ends;

strain responsive means coupled to said fiber and attched to the structural material in close proximity to the stress raiser such that cracks originating therefrom cause tensile forces which will break said fiber in tension, said strain responsive means consisting of two non-contiguous rigid members bonded by their lower surfaces to the structural material to form a gap between said members and a graphite epoxy composite having lower strain than said fiber by which said fiber is attached to said members, said composite spanning said gap; and light responsive means optically coupled to the other of said ends for detecting breakage of said fiber.

2. Apparatus for detecting a crack in a structure comprising, in combination:

two spaced connectors formed to be rigidly attached to the structure;

an optical fiber of finite length having two ends and extending between said connectors;

a composite bonded to said fiber along the entire length thereof and to said connectors, said composite having a lower deformation per unit of length than said fiber;

a light source at one of said ends of the fiber positioned to transmit light along the length of said fiber; and a light detector at the other of said ends of said fiber for detecting a discontinuity in the transmitted light;

whereby a crack in the structure between the connectors is quickly detected.

* * * * *